(12) United States Patent
Allin

(10) Patent No.: US 7,269,868 B1
(45) Date of Patent: Sep. 18, 2007

(54) MULTIPURPOSE HITCH PIN HAMMER TOOL

(76) Inventor: Ivan M. Allin, 5784 Regional Rd. 18, Newtonville, ON (CA) L1H 7K4

( * ) Notice: Subject to any disclaimer, the term of this patent is extended or adjusted under 35 U.S.C. 154(b) by 196 days.

(21) Appl. No.: 11/051,822

(22) Filed: Feb. 4, 2005

(51) Int. Cl.
*B25D 1/00* (2006.01)

(52) U.S. Cl. .......................................................... 7/143

(58) Field of Classification Search .................... 7/143, 7/146, 147; 81/20, 22; 24/453, 573.09; 301/113; 403/150, 157, 161
See application file for complete search history.

(56) References Cited

U.S. PATENT DOCUMENTS

| | | | | |
|---|---|---|---|---|
| 84,142 | A | * | 11/1868 | Smoot .......................... 81/437 |
| 224,023 | A | | 2/1880 | Mallery |
| 1,660,836 | A | * | 2/1928 | Gilks ............................. 7/138 |
| 3,393,924 | A | | 7/1968 | Silver |
| 3,963,264 | A | | 6/1976 | Down |
| 4,298,212 | A | | 11/1981 | Jamison |
| 4,398,322 | A | | 8/1983 | Ewen |
| 4,483,550 | A | | 11/1984 | Dubbe |
| 4,890,854 | A | | 1/1990 | Hoover |
| 5,427,399 | A | * | 6/1995 | Olson ......................... 280/515 |
| 6,595,397 | B2 | * | 7/2003 | Teich .......................... 224/410 |
| 2001/0029633 | A1 | * | 10/2001 | Johnson ......................... 7/146 |

FOREIGN PATENT DOCUMENTS

WO     WO83/02248     *   7/1983

* cited by examiner

*Primary Examiner*—Joseph J. Hail, III

(57) ABSTRACT

A multipurpose hitch pin hammer device and an associated method of using the device for coupling the device to a tongue of a towed vehicle with a hitch of a towing vehicle and for hammering objects, wherein the tongue and hitch having vertical apertures therethrough which are vertically aligned when the tongue and hitch are coupled are disclosed. The device comprises a hammer means, a shank, a ring flange, a sleeve, a hairpin, and a tapered nose section. The shank has a generally circular cross section which is smaller in diameter than the vertically aligned apertures for insertion downwardly through the vertically aligned apertures and has a length such that an upper end of the shank is positioned above the apertures and a lower end of the shank extends below the apertures, wherein the upper end of the shank is attached to the hammer means. The ring flange is attached to the shank, so that the ring flange is positioned circumferentially around the shank and located below the hammer means. The sleeve traverses through a lower end portion of the shank, in which the sleeve defines a hollow bore hole through the shank. The hairpin is slidably inserted in the hollow bore hole of the shank. The tapered nose section is attached to the lower end of the shank. The method of using the device comprises the steps of aiming, aligning, braking, conjoining, coupling, driving, grasping, inserting, joining, latching, lifting, linking, mounting, obtaining, pounding, pulling, removing, tying, uncoupling, and unlatching.

3 Claims, 2 Drawing Sheets

MULTIPURPOSE HITCH PIN HAMMER TOOL

FIELD OF THE INVENTION

The present invention relates to tool devices, more particularly, to a multipurpose hitch pin hammer hybrid tool device and an associated method of using the device.

DESCRIPTION OF THE PRIOR ART

Farm tractors and the like are conventionally provided with rearwardly projecting tow bars and many implements, such as a pull-type BUSH-HOG are pulled behind conventional draft vehicles. These implements are conventionally provided with forwardly projecting tow bar assemblies including upper and lower tow bar portions having vertically registered openings formed therethrough and these tow bar portions are releasably connectible to an associated rearwardly projecting tow bar disposed between the upper and lower tow bar portions by a conventional hitch pin passed through the openings in the upper and lower tow bar portions as well as the associated rearwardly projecting tow bar.

Hitch pins are commonly used to couple the hitch of a towing vehicle such as an agricultural tractor with a tongue of a towed vehicle such as an agricultural implement. Various types of hitch pins have been developed which extend through holes in the hitch and the tongue to connect the two vehicles.

Various forms of hitch pins are known in the art. In one common arrangement, the pin merely comprises an elongated cylindrical member having a handle at one end thereof, with the size of the handle being larger than the aperture in the trailer hitch with which the hitch pin is to be used. Formed proximate the opposite end of the pin is a transversely extending bore, which is adapted to receive a cotter key or the like to prevent the hitch pin from being inadvertently or accidentally removed from the trailer hitch due to bouncing, vibration or the like while passing over rough terrain Because of the inconvenience, some persons forego the use of the safety cotter key pin and thus risk loss of the hitch pin should it bounce free of the trailer hitch and also risk an inadvertent uncoupling of the towed vehicle from the towing vehicle. Because of the remote locality coupled with the need to frequently repair equipment in the field, the farm hand often finds need for a hammer to aid the farm hand in performing some pressing work.

A wide variety of tool devices is currently available on the commercial market and an even larger number of these types of devices are known in the art of tool devices, for example, the horseshoe hammer disclosed by Mallery in U.S. Pat. No. 224,023; the towing unit for vehicles disclosed by Silver in U.S. Pat. No. 3,393,924; the dual purpose trailer towing attachment disclosed by Down in U.S. Pat. No. 3,963,264; the hitch pin disclosed by Jamison in U.S. Pat. No. 4,298,212; the hitch pin assembly disclosed by Ewen in U.S. Pat. No. 4,398,322; the trailer hitch pin disclosed by Dubbe in U.S. Pat. No. 4,483,550; and the hitch pin disclosed by Hoover in U.S. Pat. No. 4,890,854.

While all of the above-described devices fulfill their respective, particular objectives and requirements, the aforementioned patents do not describe a multipurpose hitch pin hammer device having a hammer means, a shank, a ring flange, a sleeve, a hairpin, and a tapered nose section. This combination of elements would specifically match the user's particular individual needs of making it possible to use the device in the steps of aiming, aligning, braking, conjoining, coupling, driving, grasping, inserting, joining, latching, lifting, linking, mounting, obtaining, pounding, pulling, removing, tying, uncoupling, and unlatching. The above-described patents make no provision for a hammer means, a shank, a ring flange, a sleeve, a hairpin, and a tapered nose section.

Therefore, a need exists for a new and improved multipurpose hitch pin hammer device having a hammer means, a shank, a ring flange, a sleeve, a hairpin, and a tapered nose section. In this respect, the multipurpose hitch pin hammer device according to the present invention substantially departs from the conventional concepts and designs of the prior art, and in doing so provides an apparatus primarily developed for the purpose of providing a means for aiming, aligning, braking, conjoining, coupling, driving, grasping, inserting, joining, latching, lifting, linking, mounting, obtaining, pounding, pulling, removing, tying, uncoupling, and unlatching.

SUMMARY OF THE INVENTION

The present device and method of using, according to the principles of the present invention, overcomes the shortcomings of the prior art by providing a multipurpose hitch pin hammer device and method of using are disclosed. The device comprises a hammer means, a shank, a ring flange, a sleeve, a hairpin, and a tapered nose section. The shank has a generally circular cross section which is smaller in diameter than the vertically aligned apertures for insertion downwardly through the vertically aligned apertures and has a length such that an upper end of the shank is positioned above the apertures and a lower end of the shank extends below the apertures, wherein the upper end of the shank is attached to the hammer means. The ring flange is attached to the shank, so that the ring flange is positioned circumferentially around the shank and located below the hammer means. The sleeve traverses through a lower end portion of the shank, in which the sleeve defines a hollow bore hole through the shank. The hairpin is slidably inserted in the hollow bore hole of the shank. The tapered nose section is attached to the lower end of the shank. The method of using the device comprises the steps of aiming, aligning, braking, conjoining, coupling, driving, grasping, inserting, joining, latching, lifting, linking, mounting, obtaining, pounding, pulling, removing, tying, uncoupling, and unlatching.

In view of the foregoing disadvantages inherent in the known type multipurpose hitch pin hammer devices now present in the prior art, the present invention provides an improved multipurpose hitch pin hammer device, which will be described subsequently in great detail, is to provide a new and improved multipurpose hitch pin hammer device which is not anticipated, rendered obvious, suggested, or even implied by the prior art, either alone or in any combination thereof.

To attain this, the present invention essentially comprises a hammer means, a shank, a ring flange, a sleeve, a hairpin, and a tapered nose section. The shank has a generally circular cross section which is smaller in diameter than the vertically aligned apertures for insertion downwardly through the vertically aligned apertures and has a length such that an upper end of the shank is positioned above the apertures and a lower end of the shank extends below the apertures, wherein the upper end of the shank is attached to the hammer means. The ring flange is attached to the shank, so that the ring flange is positioned circumferentially around the shank and located below the hammer means. The sleeve traverses through a lower end portion of the shank, in which the sleeve defines a hollow bore hole through the shank. The hairpin is slidably inserted in the hollow bore hole of the shank. The tapered nose section is attached to the lower end of the shank.

There has thus been outlined, rather broadly, the more important features of the invention in order that the detailed description thereof that follows may be better understood, and in order that the present contribution of the art may be better appreciated.

The invention may also include an optional collar traversing through the hammer means defining a hollow rope hole traversing through the hammer means. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved multipurpose hitch pin hammer device that has all the advantages of the prior art multipurpose hitch pin hammer device and none of the disadvantages.

It is another object of the present invention to provide a new and improved multipurpose hitch pin hammer device that may be easily and efficiently manufactured and marketed.

An even further object of the present invention is to provide a new and improved multipurpose hitch pin hammer device that has a low cost of manufacture with regard to both materials and labor, and which accordingly is then susceptible of low prices of sale to the consuming public, thereby making such multipurpose storage unit and system economically available to the buying public.

Still another object of the present invention is to provide a new multipurpose hitch pin hammer device that provides in the apparatuses and methods of the prior art some of the advantages thereof, while simultaneously overcoming some of the disadvantages normally associated therewith.

Even still another object of the present invention is to provide a multipurpose hitch pin hammer device having a hammer means, a shank, a ring flange, a sleeve, a hairpin, and a tapered nose section. This combination of elements makes it possible to use the device in the steps of aiming, aligning, braking, conjoining, coupling, driving, grasping, inserting, joining, latching, lifting, linking, mounting, obtaining, pounding, pulling, removing, tying, uncoupling, and unlatching.

Lastly, it is an object of the present invention to provide a new and improved method of using comprising the steps of aiming, aligning, braking, conjoining, coupling, driving, grasping, inserting, joining, latching, lifting, linking, mounting, obtaining, pounding, pulling, removing, tying, uncoupling, and unlatching.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
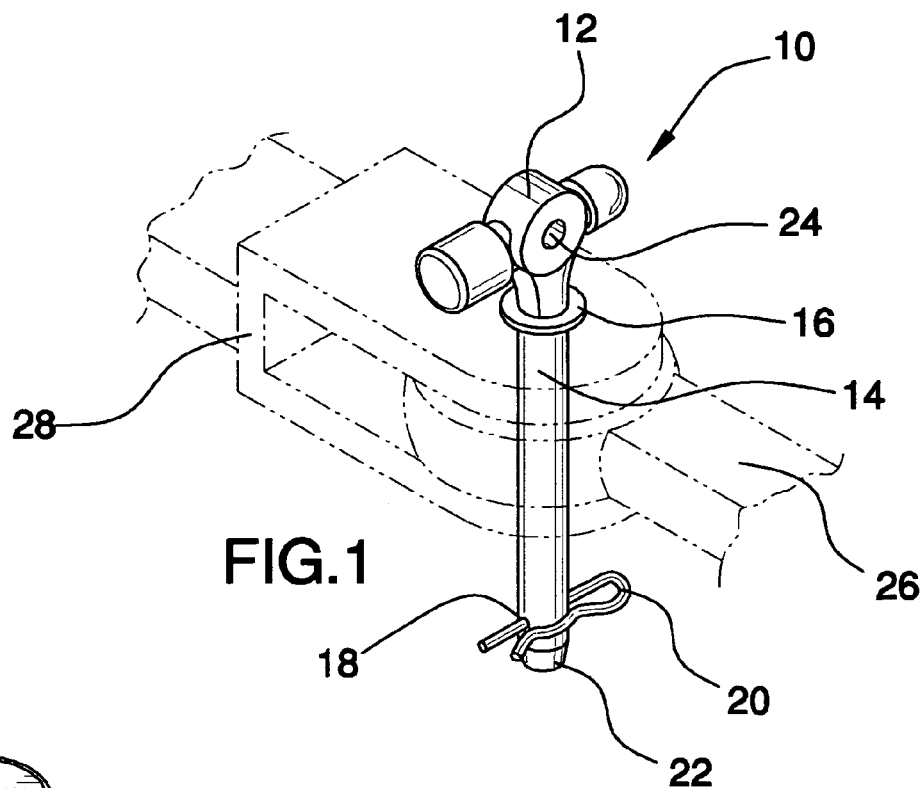
FIG. 1 is a perspective view of a preferred embodiment of the multipurpose hitch pin hammer device constructed in accordance with the principles of the present invention mounted within a vertical aperture.
Figure 2:
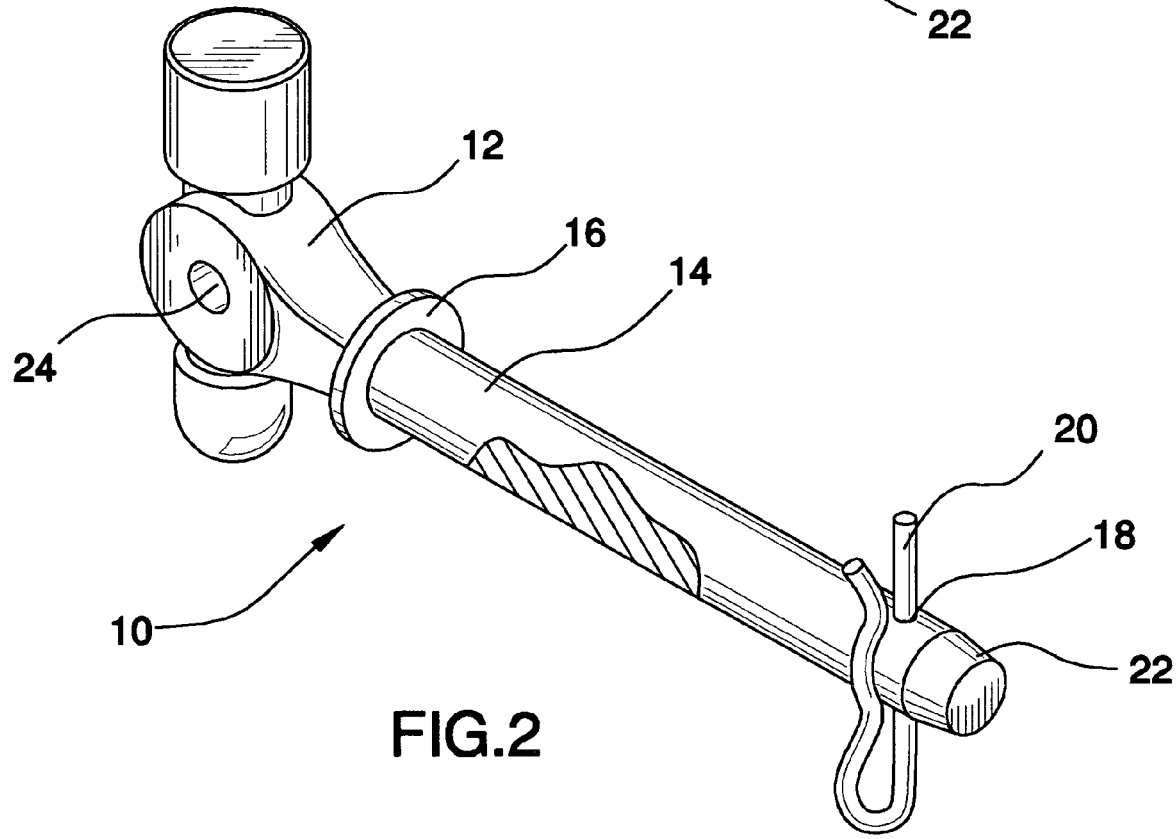
FIG. 2 is a perspective view of a preferred embodiment of the multipurpose hitch pin hammer device of the present invention.
Figure 3:
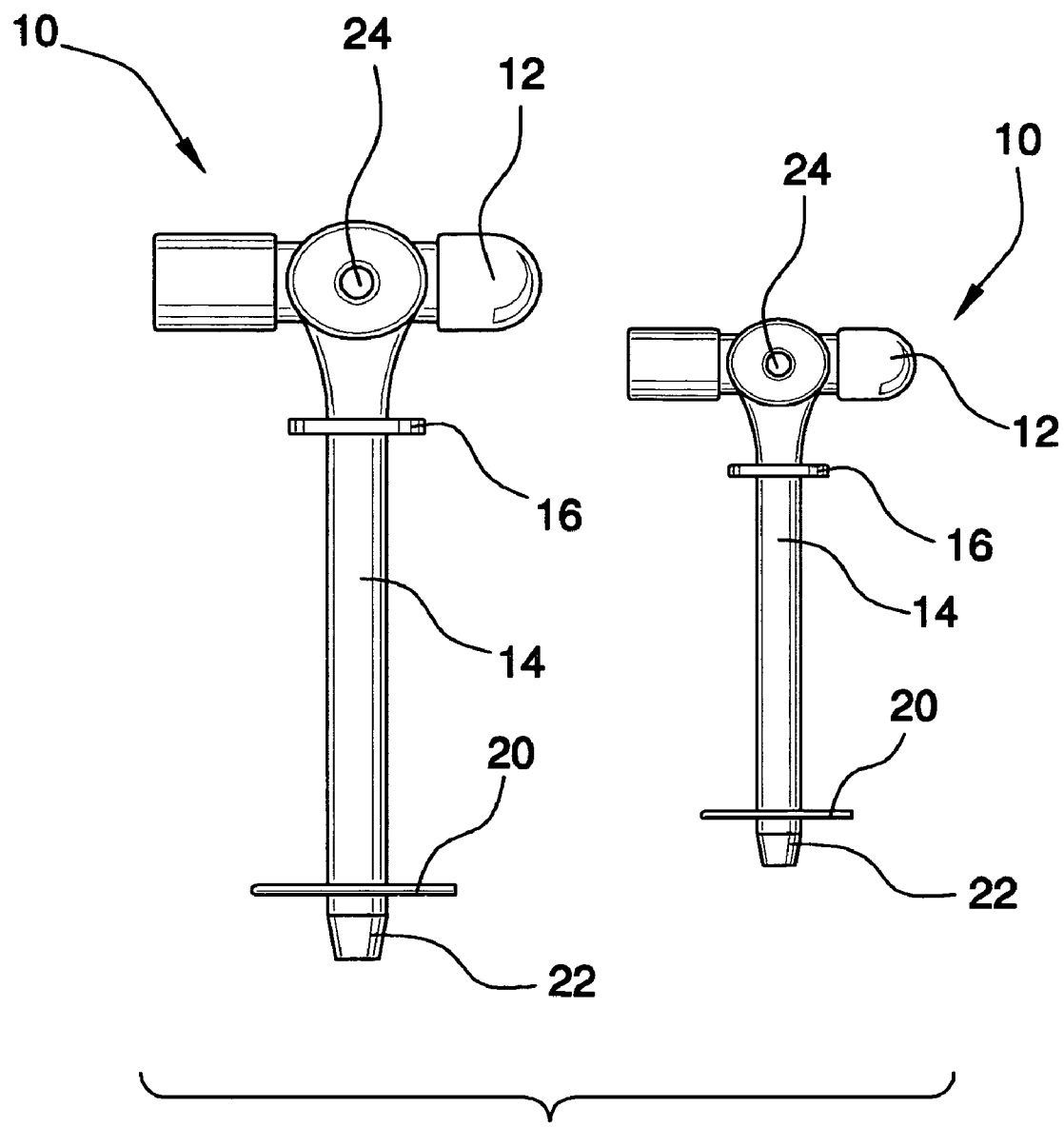
FIG. 3 is a side plan view of two preferred embodiments of the multipurpose hitch pin hammer device of the present invention.

Referring now to the drawings, and in particular FIGS. 1 to 3 thereof, one preferred embodiment of the present invention is shown and generally designated by the reference numeral 10. One preferred embodiment of a multipurpose hitch pin hammer device 10 for coupling a tongue 26 of a towed vehicle with a hitch 28 of a towing vehicle and for hammering objects, wherein the tongue 26 and hitch 28 having vertical apertures therethrough which are vertically aligned when the tongue 26 and hitch 28 are coupled, the device 10 comprising: a hammer means 12; a shank 14, a ring flange 16, a sleeve, a hairpin 20, and a tapered nose section 22. The shank 14 has a generally circular cross section which is smaller in diameter than the vertically aligned apertures for insertion downwardly through the vertically aligned apertures and has a length such that an upper end of the shank 14 is positioned above the apertures and a lower end of the shank 14 extends below the apertures, wherein the upper end of the shank 14 is attached to the hammer means 12. The ring flange 16 is attached to the shank 14, the ring flange 16 positioned circumferentially around the shank 14 and located below the hammer means 12. The sleeve traverses through a lower end portion of the shank 14, in which the sleeve defines a hollow bore hole 18 through the shank 14. The hairpin 20 is slidably inserted in the hollow bore hole 18 of the shank 14. The tapered nose section 22 is attached to the lower end of the shank 14.

An optional collar traversing through the hammer means 12 may be added to the device in which the optional collar defines a hollow rope hole 24 traversing through the hammer means 12.

The dimensions of the shank 14 may be any size. Some preferred configurations of the dimensions of the shank 14 are selected from the group selected from the shank 14 having a diameter of about one half inch thick, the shank 14 having a diameter of about three fourths of an inch thick, the shank 14 having a diameter of about one inch thick, the shank 14 having a diameter of about one and one fourth inches thick, and the shank 14 having a diameter of about one and one half inches thick.

The location and size of the ring flange 16 may be any location and size. One preferred configuration of the ring flange 16 is that it is positioned on the shank 14 approximately three fourths of an inch away from the hammer means 12. One preferred configuration of the size of the ring flange 16 has an outer diameter of at least two inches.

Some preferred configurations of the length of the shank 14 may be selected from the group consisting of the shank 14 is at least four inches long.

The device may be colored so that it may be easily located. One preferred configuration of the device 10 is painted.

The hammer means 12 of the device may be any commercially known hammer means. One preferred configuration of the hammer means includes a hemispherical head attached to an opposing flattened cylindrical head, whereby the hammer means 12 comprises a ball-peen hammer. Another preferred configuration of the hammer means 12 includes a pair of arcuately curved diverging tapered prong members attached to an opposing flattened cylindrical head, whereby the hammer means 12 comprises a standard claw hammer. Yet another preferred configuration of the hammer means 12 includes a tapered rectangular spike member attached to an opposing flattened square head, whereby the hammer means 12 comprises a bricklayers hammer. Still another preferred configuration of the hammer means 12 includes a first flattened hexagonal head attached to an opposing second flattened hexagonal head, whereby the hammer means 12 comprises a double-faced hammer. Still yet another preferred configuration of the hammer means 12 includes a first flattened rectangular head attached to an opposing triangularly tapered rectangular head, whereby the hammer means 12 comprises a riveting hammer.

The device 10 may be made of any sturdy material such as forged steel.

Another preferred embodiment of the device consist essentially of: a hammer means 12, a shank 14, a ring flange 16, a sleeve, a hairpin 20, and a tapered nose section 22. The hammer means 12 including a hemispherical head attached to an opposing flattened cylindrical head and a collar traversing through the hammer means 12, the collar defining a hollow rope hole 24 traversing through the hammer means 12, whereby the hammer means 12 comprises a ball-peen hammer with the hollow rope hole 24 traversing through the hammer means 12. The shank 14 having a generally circular cross section which is smaller in diameter than the vertically aligned apertures for insertion downwardly through the vertically aligned apertures and has a length such that an upper end of the shank 14 is positioned above the apertures and a lower end of the shank 14 extends below the apertures, the upper end of the shank 14 is attached to the hammer means 12. The ring flange 16 attached to the shank 14, the ring flange 16 positioned circumferentially around the shank 14 and located below the hammer means 12. The sleeve traversing through a lower end portion of the shank 14, the sleeve defining a hollow bore hole 18 through the shank 14. The hairpin 20 is slidably inserted in the hollow bore hole 18 of the shank 14. The tapered nose section 22 attached to the lower end of the shank 14.

One preferred embodiment of a method of using a multipurpose hitch pin hammer device 10 for coupling a tongue 26 of a towed vehicle with a hitch 28 of a towing vehicle and for hammering objects, wherein the tongue 26 and hitch 28 having vertical apertures therethrough which are vertically aligned when the tongue 26 and hitch 28 are coupled, the method comprising the steps of aiming, aligning, braking, conjoining, coupling, driving, grasping, inserting, joining, latching, lifting, linking, mounting, obtaining, pounding, pulling, removing, tying, uncoupling, and unlatching. The obtaining step comprises obtaining the device 10 comprising: a hammer means 12 including a hemispherical head attached to an opposing flattened cylindrical head and a collar traversing through the hammer means 12, the collar defining a hollow rope hole 24 traversing through the hammer means 12, whereby the hammer means 12 comprises a ball-peen hammer with the hollow rope hole 24 traversing through the hammer means 12; a shank 14 having a generally circular cross section which is smaller in diameter than the vertically aligned apertures for insertion downwardly through the vertically aligned apertures and has a length such that an upper end of the shank 14 is positioned above the apertures and a lower end of the shank 14 extends below the apertures, the upper end of the shank 14 is attached to the hammer means 12; a ring flange 16 attached to the shank 14, the ring flange 16 positioned circumferentially around the shank 14 and located below the hammer means 12; a sleeve traversing through a lower end portion of the shank 14, the sleeve defining a hollow bore hole through the shank 14; a hairpin 20 slidably inserted in the hollow bore hole of the shank 14; and a tapered nose section 22 attached to the lower end of the shank 14. The coupling step comprises coupling together the tongue 26 of the towed vehicle with the hitch 28 of the towing vehicle so that the tongue 26 of the towed vehicle and the hitch 28 of the towing vehicle form the vertical apertures therethrough the tongue 26 and the hitch 28. The removing step comprises removing slidably the hairpin 20 from the hollow bore hole of the shank 14. The aiming comprises aiming the tapered nose section 22 of the device 10 towards the vertical apertures therethrough the tongue 26 and the hitch 28 when the hairpin 20 is removed from the hollow bore hole of the shank 14. The inserting step comprises inserting a portion of the shank 14 through the vertical apertures therethrough the tongue 26 and the hitch 28 when the hairpin 20 is removed from the hollow bore hole of the shank 14 wherein said inserting step performed subsequent to said aiming step. The latching step comprises latching slidably together the hairpin 20 into the hollow bore hole of the shank 14 when the portion of the shank 14 is inserted through the vertical apertures therethrough the tongue 26 and the hitch 28. The driving step comprises driving the towing vehicle while the portion of the shank 14 is inserted through the vertical apertures therethrough the tongue 26 and the hitch 28 and while the hairpin 20 is latched into the hollow bore hole of the shank 14, whereby said driving step comprising towing the towed vehicle with the towing vehicle. The braking step comprises braking the driven towing vehicle and the towed vehicle to a full stop. The unlatching step comprises unlatching the hairpin 20 from the hollow bore hole of the shank 14, said unlatching step is performed subsequent to said braking step. The lifting step comprises lifting upwardly the shank 14 of the device 10 away from the vertical apertures therethrough the tongue 26 and the hitch 28 when the hairpin 20 is unlatched from the hollow bore hole of the shank 14. The grasping step comprises grasping onto the lower end of the shank 14, wherein said grasping step performed subsequent to said lifting step. The pounding step comprises pounding an object with the hammer means 12 while grasping the lower end of the shank 14. The uncoupling step comprises uncoupling the tongue 26 of the towed vehicle from the hitch 28 of the towing vehicle, wherein said uncoupling step performed subsequent to said unlatching and lifting steps. The aligning step comprises aligning the tapered nose section 22 of the device 10 towards the uncoupled tongue 26 of the towing vehicle when the hairpin 20 is not latched into the bore hole of the shank 14. The linking step comprises linking slidably together the lower end of the shank 14 to the uncoupled tongue 26 of the towing vehicle so that the tapered nose section 22 of the device 10 extends below the tongue 26 of the towing vehicle. The conjoining step comprises conjoining the hairpin 20 into the bore hole of the shank 14 when the shank 14 is linked to the uncoupled tongue 26 of the towing vehicle. The joining step comprises joining together a first end of a rope through the rope hole 24 of the hammer means 12 of the shank 14. The tying step comprises tying the first end of the rope to the hammer means 12 of the shank 14 when the first end of the rope is joined to the rope hole 24 of the hammer means 12 of the shank 14. The mounting step comprises mounting the second end of the rope in the towing vehicle. The pulling step comprises pulling on a portion of the rope to slidably remove the hitch pin hammer device 10 from the uncoupled tongue 26 of the towing vehicle whereby an operator is able to pull the rope in order to remove the hitch pin from the tongue 26 of the towed vehicle without the operator getting off of the towing vehicle.

Referring now to FIG. 1 which depicts a perspective view of an preferred embodiment of the multipurpose hitch pin hammer device 10 shown coupled in vertical apertures therethrough a tongue 26 of a towed vehicle with a hitch 28 of a towing vehicle and for hammering objects, the device 10 comprises: a hammer means 12; a shank 14, a ring flange 16, a sleeve, a hairpin 20, and a tapered nose section 22. The hammer means 12 is shown including a hemispherical head attached to an opposing flattened cylindrical head and a collar traversing through the hammer means 12, in which the collar is shown defining a hollow rope hole 24 traversing through the hammer means 12, whereby the hammer means 12 comprises a ball-peen hammer with the hollow rope hole 24 traversing through the hammer means 12. The shank 14 is shown having a generally circular cross section which is smaller in diameter than the vertically aligned apertures for insertion downwardly through the vertically aligned apertures and has a length such that an upper end of the shank 14 is positioned above the apertures and a lower end of the shank 14 extends below the apertures, wherein the upper end of the shank 14 is attached to the hammer means 12. The ring flange 16 is shown attached to the shank 14, the ring flange 16 positioned circumferentially around the shank 14 and located below the hammer means 12. The sleeve is shown traversing through a lower end portion of the shank 14, in which the sleeve defines a hollow bore hole 18 through the shank 14. The hairpin 20 is shown slidably inserted in the hollow bore hole 18 of the shank 14. The tapered nose section 22 is shown attached to the lower end of the shank 14.

Referring now to FIG. 2 which depicts a perspective view of a preferred embodiment of the multipurpose hitch pin hammer device 10 comprising a hammer means 12; a shank 14, a ring flange 16, a sleeve, a hairpin 20, and a tapered nose section 22. The hammer means 12 is shown including a hemispherical head attached to an opposing flattened cylindrical head and a collar traversing through the hammer means 12, in which the collar is shown defining a hollow rope hole 24 traversing through the hammer means 12, whereby the hammer means 12 comprises a ball peen hammer with the hollow rope hole 24 traversing through the hammer means 12. The shank 14 is shown having a generally circular cross section which is smaller in diameter than the vertically aligned apertures for insertion downwardly through the vertically aligned apertures and has a length such that an upper end of the shank 14 is positioned above the apertures and a lower end of the shank 14 extends below the apertures, wherein the upper end of the shank 14 is attached to the hammer means 12. The ring flange 16 is shown attached to the shank 14, the ring flange 16 positioned circumferentially around the shank 14 and located below the hammer means 12. The sleeve is shown traversing through a lower end portion of the shank 14, in which the sleeve defines a hollow bore hole 18 through the shank 14. The hairpin 20 is shown slidably inserted in the hollow bore hole 18 of the shank 14. The tapered nose section 22 is shown attached to the lower end of the shank 14.

Referring now to FIG. 3 which depicts a side plan view of two preferred embodiments of the multipurpose hitch pin hammer device 10 shows that the device 10 may be differentially dimensioned to accommodate different needs for the device 10.

As to the manner of usage and operation of the present invention, the same should be apparent from the above description. Accordingly, no further discussion relating to the manner of usage and operation will be provided.

While a preferred embodiment of the multipurpose hitch pin hammer device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A multipurpose hitch pin hammer device for coupling a tongue of a towed vehicle with a hitch of a towing vehicle and for hammering objects, wherein the tongue and hitch having vertical apertures therethrough which are vertically aligned when the tongue and hitch are coupled, said device comprising:
   a hammer means including a hemispherical head attached to an opposing flattened cylindrical head, whereby said hammer means comprises a ball-peen hammer;
   a shank having a generally circular cross section which is smaller in diameter than the vertically aligned apertures for insertion downwardly through the vertically aligned apertures and has a length such that an upper end of the said shank is positioned above the apertures and a lower end of the shank extends below the apertures, said upper end of said shank is attached to said hammer means;
   a ring flange attached to said shank, said ring flange positioned circumferentially around said shank and located below said hammer means;
   a sleeve traversing through a lower end portion of said shank, said sleeve defining a hollow bore hole through said shank;
   a hairpin slidably inserted in said hollow bore hole of said shank;
   a tapered nose section attached to the lower end of said shank.

2. A multipurpose hitch pin hammer device for coupling a tongue of a towed vehicle with a hitch of a towing vehicle and for hammering objects, wherein the tongue and hitch having vertical apertures therethrough which are vertically aligned when the tongue and hitch are coupled, said device consisting essentially of:
   a hammer means including a hemispherical head attached to an opposing flattened cylindrical head and a collar traversing through said hammer means, said collar defining a hollow rope hole traversing through said hammer means, whereby said hammer means comprises a ball-peen hammer with said hollow rope hole traversing through said hammer means;
   a shank having a generally circular cross section which is smaller in diameter than the vertically aligned apertures for insertion downwardly through the vertically aligned apertures and has a length such that an upper end of the said shank is positioned above the apertures and a lower end of the shank extends below the apertures, said upper end of said shank is attached to said hammer means;
   a ring flange attached to said shank, said ring flange positioned circumferentially around said shank and located below said hammer means;
   a sleeve traversing through a lower end portion of said shank, said sleeve defining a hollow bore hole through said shank;
   a hairpin slidably inserted in said hollow bore hole of said shank; and
   a tapered nose section attached to the lower end of said shank.

3. A method of using a multipurpose hitch pin hammer device for coupling a tongue of a towed vehicle with a hitch of a towing vehicle and for hammering objects, wherein the tongue and hitch having vertical apertures therethrough which are vertically aligned when the tongue and hitch are coupled, said method comprising the steps of:
   obtaining the device comprising:
      a hammer means including a hemispherical head attached to an opposing flattened cylindrical head and a collar traversing through the hammer means, the collar defining a hollow rope hole traversing through the hammer means, whereby the hammer means comprises a ball-peen hammer with the hollow rope hole traversing through the hammer means;
      a shank having a generally circular cross section which is smaller in diameter than the vertically aligned apertures for insertion downwardly through the vertically aligned apertures and has a length such that an upper end of the shank is positioned above the apertures and a lower end of the shank extends below the apertures, the upper end of the shank is attached to the hammer means;
      a ring flange attached to the shank, the ring flange positioned circumferentially around the shank and located below the hammer means;
      a sleeve traversing through a lower end portion of the shank, the sleeve defining a hollow bore hole through the shank;
      a hairpin slidably inserted in the hollow bore hole of the shank; and
      a tapered nose section attached to the lower end of the shank;
   coupling together the tongue of the towed vehicle with the hitch of the towing vehicle so that the tongue of the towed vehicle and the hitch of the towing vehicle form the vertical apertures therethrough the tongue and the hitch;
   removing slidably the hairpin from the hollow bore hole of the shank;
   aiming the tapered nose section of the device towards the vertical apertures therethrough the tongue and the hitch when the hairpin is removed from the hollow bore hole of the shank;
   inserting a portion of the shank through the vertical apertures therethrough the tongue and the hitch when the hairpin is removed from the hollow bore hole of the shank wherein said inserting step performed subsequent to said aiming step;
   latching slidably together the hairpin into the hollow bore hole of the shank when the portion of the shank is inserted through the vertical apertures therethrough the tongue and the hitch;
   driving the towing vehicle while the portion of the shank is inserted through the vertical apertures therethrough the tongue and the hitch and while the hairpin is latched into the hollow bore hole of the shank, whereby said driving step comprising towing the towed vehicle with the towing vehicle;

braking the driven towing vehicle and the towed vehicle to a full stop;

unlatching the hairpin from the hollow bore hole of the shank, said unlatching step performed subsequent to said braking step;

lifting upwardly the shank of the device away from the vertical apertures therethrough the tongue and the hitch when the hairpin is unlatched from the hollow bore hole of the shank;

grasping onto the lower end of the shank, wherein said grasping step performed subsequent to said lifting step;

pounding an object with the hammer means while grasping the lower end of the shank;

uncoupling the tongue of the towed vehicle from the hitch of the towing vehicle, wherein said uncoupling step performed subsequent to said unlatching and lifting steps;

aligning the tapered nose section of the device towards the uncoupled tongue of the towing vehicle when the hairpin is not latched into the bore hole of the shank;

linking slidably together the lower end of the shank to the uncoupled tongue of the towing vehicle so that the tapered nose section of the device extends below the tongue of the towing vehicle;

conjoining the hairpin into the bore hole of the shank when the shank is linked to the uncoupled tongue of the towing vehicle;

joining together a first end of a rope through the rope hole of the hammer means of the shank;

tying the first end of the rope to the hammer means of the shank when the first end of the rope is joined to the rope hole of the hammer means of the shank;

mounting the second end of the rope in the towing vehicle; and pulling on a portion of the rope to slidably remove the hitch pin hammer device from the uncoupled tongue of the towing vehicle whereby an operator is able to pull the rope in order to remove the hitch pin from the tongue of the towed vehicle without the operator getting off of the towing vehicle.

\* \* \* \* \*